United States Patent
Hughes et al.

(10) Patent No.: US 11,423,618 B2
(45) Date of Patent: Aug. 23, 2022

(54) IMAGE GENERATION SYSTEM AND METHOD

(71) Applicant: Sony Interactive Entertainment Inc., Tokyo (JP)

(72) Inventors: Colin Jonathan Hughes, London (GB); Maurizio Cerrato, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/179,516

(22) Filed: Feb. 19, 2021

(65) Prior Publication Data

US 2021/0279958 A1 Sep. 9, 2021

(30) Foreign Application Priority Data

Mar. 3, 2020 (GB) ..................................... 2003031

(51) Int. Cl.
*G06T 17/20* (2006.01)
*G06T 15/00* (2011.01)
*G06T 15/08* (2011.01)
*G06T 15/80* (2011.01)
*G06T 17/10* (2006.01)

(52) U.S. Cl.
CPC .......... *G06T 17/205* (2013.01); *G06T 15/005* (2013.01); *G06T 15/08* (2013.01); *G06T 15/80* (2013.01); *G06T 17/10* (2013.01)

(58) Field of Classification Search
None
See application file for complete search history.

(56) References Cited

U.S. PATENT DOCUMENTS

| | | | |
|---|---|---|---|
| 6,172,684 B1 * | 1/2001 | Lapidous | G06T 11/20 345/443 |
| 7,439,983 B2 | 10/2008 | Arnaud | |
| 9,818,218 B2 | 11/2017 | Nystad | |
| 10,026,150 B2 | 7/2018 | Smith | |
| 2015/0054841 A1 * | 2/2015 | Cornell | G06T 15/005 345/581 |
| 2018/0082399 A1 * | 3/2018 | Martin | G06T 15/40 |
| 2019/0318445 A1 * | 10/2019 | Benthin | G06T 17/10 |

OTHER PUBLICATIONS

Extended European Search Report for corresponding EP Application No. 21155193.2, 16 pages, dated Jul. 13, 2021.
Combined Search and Examination Report for corresponding GB Application No. 2003031.8, 12 pages, dated Oct. 6, 2020.

(Continued)

*Primary Examiner* — Nurun Flora
(74) *Attorney, Agent, or Firm* — Matthew B. Dernier, Esq.

(57) ABSTRACT

An image generation system comprising a bounding volume hierarchy, BVH, storage unit operable to store a BVH comprising a hierarchical structure of a plurality of triangles describing a virtual scene, a BVH position buffer operable to store data for identifying the location of one or more triangles within the BVH, and a fetch shader operable to identify vertex indices for use in rendering images, to obtain one or more triangles within the BVH corresponding to those vertex indices, and to provide vertex data corresponding to those triangles to a vertex shader operable to perform a vertex shading process.

12 Claims, 6 Drawing Sheets

(56) References Cited

OTHER PUBLICATIONS

John Nystad, et al., "Vertix Shader Introduction" URL:http://developer.download.nvidia.com/assests/gamedev/docs/NVidiaVertexShaderIntro.pdf. NVIDIA Technical Brief, 19 pages, (Jan. 1, 2001).

Evans, W., Kirkpatrick, D. & Townsend, G. "Right-Triangulated Irregular Networks" Department of Computer Science, University of British Columbia, Vancouver, Algorithmica 30, 264-286 (Jan. 18, 2014).

* cited by examiner

IMAGE GENERATION SYSTEM AND METHOD

BACKGROUND OF THE INVENTION

Field of the Invention

This disclosure relates to an image generation system and method

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Raytracing is a rendering technique that has received widespread interest in recent years for its ability to generate a high degree of visual realism. Raytracing is often utilised in simulations of a number of optical effects within an image, such as reflections, shadows, and chromatic aberrations.

This can be useful for any computer-based image generation process—for example, for special effects in movies and in generating images for computer games. While such techniques have been discussed and used for a relatively long time, it is only more recently that processing hardware has become suitably powerful so as to be able to implement raytracing techniques with an acceptably low latency for real-time applications or at least more extensive use within a piece of content.

Such techniques effectively aim to determine the visual properties of objects within a scene by tracing, from the camera, a ray for each pixel in the scene. Of course, this is a rather computationally intensive process—a large number of pixels are expected to be used for displaying a scene, and this may lead to a large number of calculations even for simpler scenes (such as those with few reflections and the like). In view of this, scanline rendering and other rendering methods have generally been preferred for rendering where the latency is considered to be important despite the lower image quality.

One technique that seeks to improve the rendering times associated with raytracing based methods is the use of bounding volumes to represent groups of objects. These bounding volumes are stored in a bounding volume hierarchy (BVH) which has a structure that is considered suitable for navigation as a part of a raytracing process. The use of bounding volumes is advantageous in that a group of objects may be tested for intersections by rays together, rather than on a per-object basis. This can mean that the number of intersection tests is reduced, as well as the calculations for each being simplified by the use of a simplified shape (such as a box or sphere) that is representative of the objects. While in principle advantageous, the BVH represents a separate data structure that comprises information that is useful for generating images—which leads to a substantial increase in the amount of data storage and navigation that is required.

It may therefore be considered advantageous to reduce the amount of additional data that is required for the implementation of raytracing methods.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Referring now to the drawings, wherein like reference numerals designate identical or corresponding parts throughout the several views, a system and method for implementing an improved image rendering process is disclosed.

In the embodiments described below, a modification to the rasterization process is considered. Existing rasterization processes used to render images require the use of a vertex buffer with an associated set of indices (stored in an index buffer) for defining objects in a scene. The vertex buffer stores a list of vertex coordinates, while the index buffer identifies triplets of coordinates representing the vertices of a triangle to be rendered; this is performed so as to reduce the redundancy associated with listing each coordinate when defining each triangle (as a number of the vertices will share the same location, for example).

Figure 1:
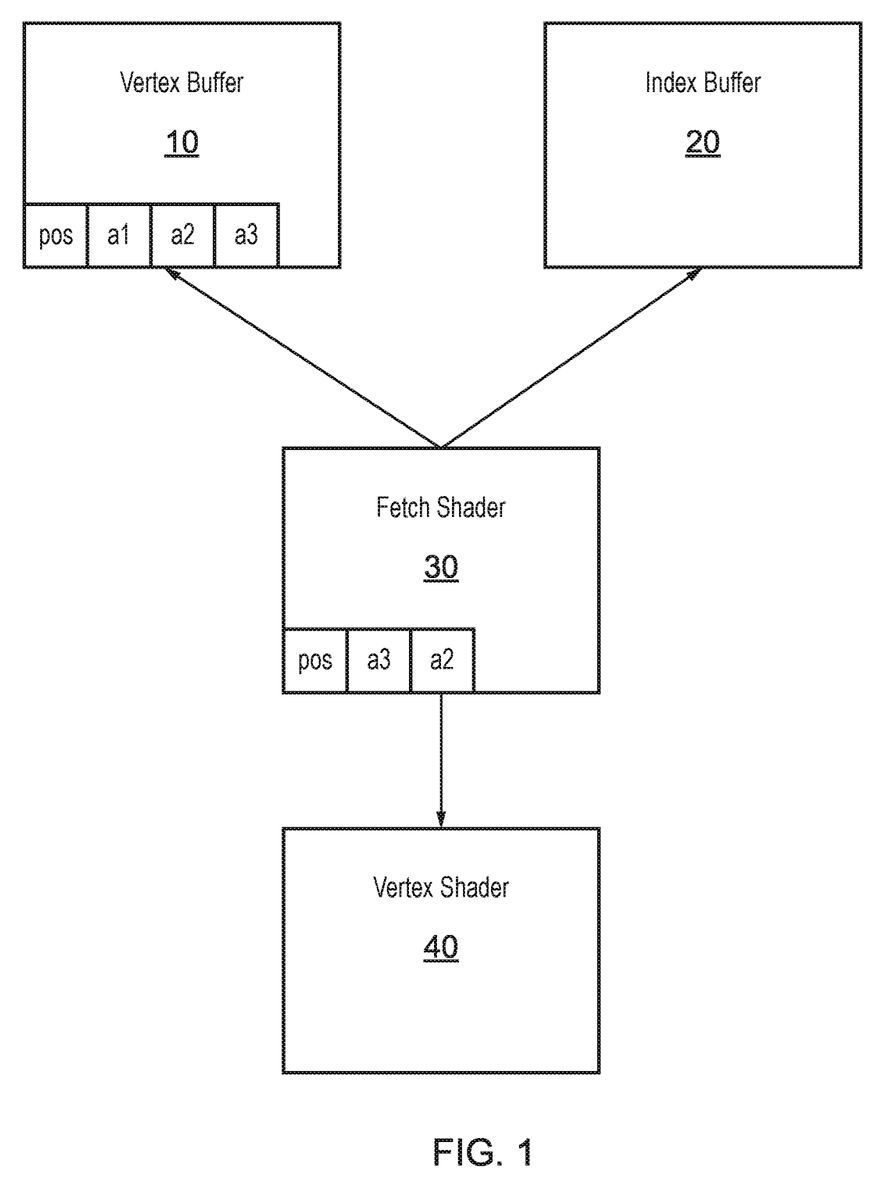
FIG. 1 schematically illustrates a vertex shading system.

FIG. 1 schematically illustrates a typical vertex shading arrangement. In this arrangement, the vertex buffer 10 stores information identifying a number of vertices and their three-dimensional location within a virtual environment to be rendered. The index buffer 20 stores the indices identifying the vertices, as stored in the vertex buffer 10, representing particular triangles (or other polygons) that may be rendered.

In FIG. 1, the vertex buffer 10 is shown as storing three sets of vertex attribute data (a1, a2, a3) along with 'pos' data. The attribute data a1, a2, a3, comprises information about the respective vertices such as colour. The pos data comprises information about the positions of each of these vertices—this is generally in the form of a triplet of floating point numbers that describe a three-dimensional position.

This position information is often stored in the vertex buffer in object space, which may be in the form of an array—this is considered to be a linear storage method.

A fetch shader 30 is operable to collect information from each of the vertex buffer 10 and the index buffer 20 and provide the information to the vertex shader 40, which is operable to perform a vertex shading process. The collected information corresponds only to the information that is required by the vertex shader 40 for a particular operation, rather than necessarily comprising the entire contents of each of the buffers 10 and 20. This is illustrated in FIG. 1 by the fetching only of pos, a3 and a2 by the fetch shader 30—thereby omitting a1 (and the corresponding position data) from the selection and further processing.

For example, when rendering a particular object within a scene, the fetch shader 30 may be operable to obtain a set of indices from the index buffer 20 that identify the vertices associated with that object. Corresponding vertex location data, as required to relate the indices to a shape that can be rendered correctly, are also obtained by the fetch shader 30 from the vertex buffer 10. The fetch shader 30 is then operable to pass this data to the vertex shader 40 and a vertex shading operation is performed. Examples of the operation of a vertex shader may include one or more of converting a three-dimensional vertex location into a two-dimensional screen position, and/or manipulating the position or colour associated with one or more vertices. This output is then provided to a further stage in the rendering pipeline, such as a geometry shader or a rasterizer.

Another part of the image rendering process may be that of raytracing, as described above. Raytracing often makes use of BVHs as an efficient data storage structure, the format of which is often bound to the hardware used to store and/or implement—and therefore it may be difficult to provide substantial improvements to the BVH structure itself. The structure of an exemplary BVH is discussed below with reference to FIG. 2, while the use of bounding volumes as part of a simplified raytracing process is discussed with reference to FIGS. 3 and 4.

Figure 2:
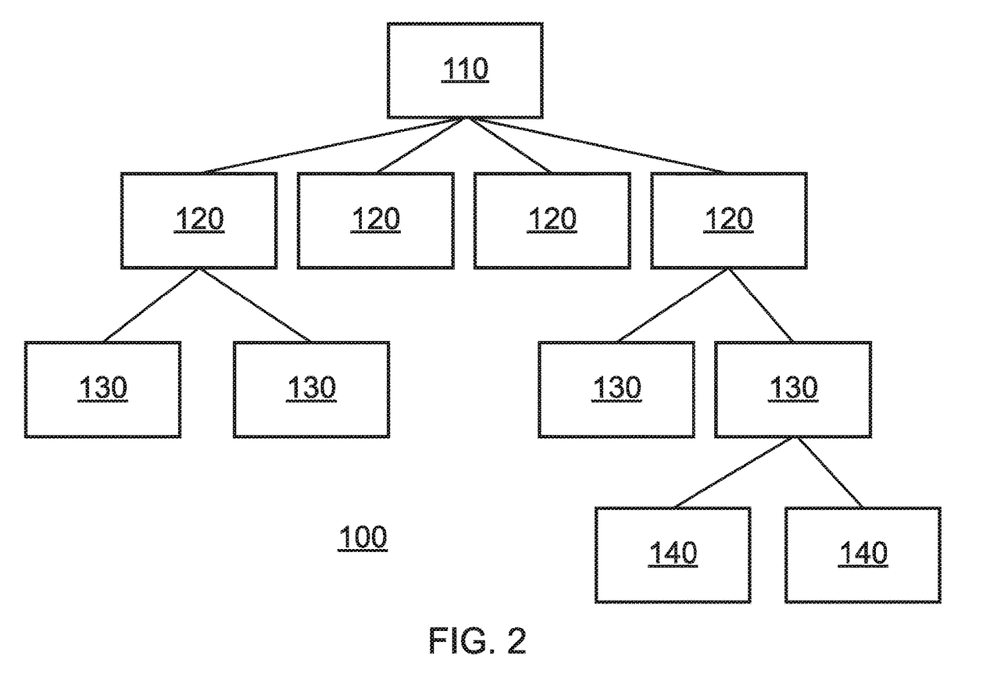
FIG. 2 schematically illustrates a bounding volume hierarchy.

FIG. 2 schematically illustrates a simple example of a BVH; in this example, each box (bounding volume) represents one or more objects at a given level of detail. Each of the boxes is included in the box above it in the hierarchy—for example, the box 110 comprises information about all of objects in the environment, while each of the boxes 120 comprise a subset of the objects. These subsets may be determined in any suitable manner, although it is often considered that methods by which objects that are close to each other within an environment are grouped together and represented by the same bounding volume are preferable.

The level of detail for each level can be determined in any suitable fashion, and the BVH may have a maximum level of detail that is defined. For example, the BVH may terminate with bounding volumes representing groups of objects—this would lead to a coarse representation, but one that is reduced in size and may be traversed very quickly. Alternatively, the BVH may terminate with bounding volumes representing portions of objects—while this offers a finer approximation of the objects, of course this provides a BVH that is larger and may take longer to traverse. The BVH may be defined so as to comprise elements of both—such that some objects have a finer/coarser representation than others.

BVHs can be generated in a number of ways, each with its own benefits and drawbacks. For example, a top-down approach can be taken in which the bounding volumes are defined beginning with the largest sets possible. That is, the input (such as the set of objects within an environment, or a representation of those objects) is divided into two or more subsets that are each then subdivided—that is, bounding volumes are generated beginning with box 110, and proceeding to boxes 120 and so on. While this represents a fast implementation, it often results in a BVH that is rather inefficient, which can result in a larger size overall or a reduced ease of navigation.

An alternative method is that of the bottom-up approach. In this approach, the bounding volumes are defined beginning with the smallest volumes in the BVH. In the example of FIG. 2, this would mean that bounding volumes 140 are defined first, before progressing upwards to bounding volumes 130. While this can generally produce better (that is, more efficient) BVHs than the top-down approach, it can be more challenging to implement in an effective manner.

Each of these methods require information about all of the objects to be available before the BVH can be generated; this is of course acceptable in many applications, but in others it may be preferred that a BVH is able to be generated on-the-fly.

A third approach that may be considered is that of insertion methods. These may be performed on-the-fly, and they are performed by inserting objects into the bounding volumes of a BVH on a per-object basis. This means that only information about that object is necessary at the time of insertion. Insertion approaches cover a wide range of related methods in which the placement of the object is determined in a manner that identifies an optimal or suitable placement. For example, a function may be defined that evaluates the impact (in terms of size or navigability or the like) of an insertion upon the BVH, with the insertion being performed in a manner that minimises or otherwise reduces the impact upon the BVH.

Of course, any other suitable approaches may be considered compatible with the teachings of the present disclosure, rather than being limited to those discussed above.

Any suitable input data may be represented using a BVH and associated bounding volumes. For example, video games may provide a suitable source of input data for generating such a structure—in this case, the input information may be data about the virtual objects that defines their respective dimensions and locations. Similarly, information describing a real environment could be used as an information source—for example, information may be generated from images of a real environment and the objects within the environment, and this information can be used to generate a BVH that may be used to render images of that environment.

Figure 3:
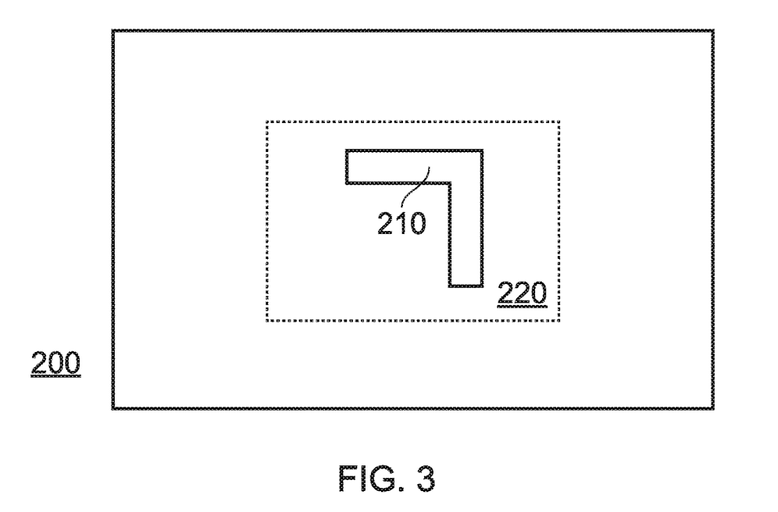
FIG. 3 schematically illustrates a bounding volume.
Figure 4:
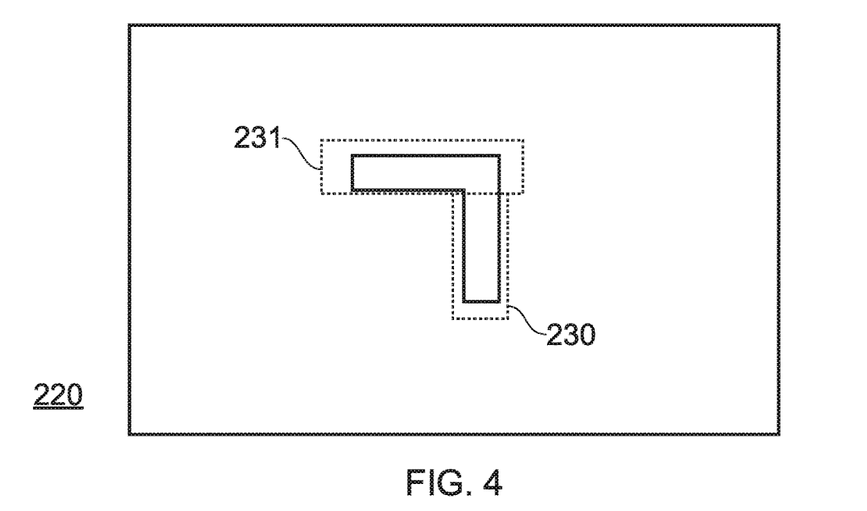
FIG. 4 schematically illustrates a plurality of bounding volumes.

FIGS. 3 and 4 schematically illustrate the use of bounding volumes in raytracing algorithms.

FIG. 3 schematically illustrates a viewport 200 in which rays are to be traced—this can be a camera view within a virtual environment to be presented to a viewer, for example. The scene comprises an object 210, which is enclosed by a bounding volume 220. Rather than testing intersections for each ray with each of the polygons that make up the object 210, which could be a rather large number, intersections are only tested with respect to the bounding volume 220. Of course, any rays that do not intersect the bounding volume 220 will not intersect the polygons that form the object 210—although of course rays may intersect the bounding volume 220 that will not intersect the polygons forming the object 210.

For example, if one hundred rays were to be tested for intersections, only one hundred tests would be required at this stage as there is a single object (the bounding volume 220) to test for each ray—rather than one hundred multiplied by the number of polygons making up the object 210.

FIG. 4 shows an enlarged version of the bounding volume 220, with smaller bounding volumes 230 and 231 used to represent the object 210. Intersections of the bounding volumes 230 and 231 can be tested for each of the rays that were found to intersect the bounding volume 220, to obtain a finer approximation of the visual appearance of the object 210.

If, for example, it were found that only ten rays intersected the bounding volume 220, this stage would require thirty tests (that is, a test for each ray with each bounding volume). This is again a very small amount relative to the testing of one hundred multiplied by the number of polygons making up the object 210 as noted above. It is therefore apparent that the falling number of rays to be considered for intersection is sufficient to offset the increasing number of bounding volumes to be considered, such that overall the total number of intersections to be tested is lower than the amount required if no bounding volumes are defined and no BVH is utilised.

In a practical implementation these volumes may be divided further until the surfaces of the object 210 are represented with a suitable level of precision for the application—such as when the bounding volumes and the polygons (primitives) representing the object occupy a similar display area, at which point the polygons may be used instead.

In these examples, the bounding volume 220 may be considered to be a higher level in the BVH than the bounding volumes 230, 231—for instance, the bounding volume 220 may correspond to a volume such as 120 of FIG. 2, while the smaller bounding volumes 230, 231 may correspond to volumes such as 130 of FIG. 2.

It is apparent from these Figures that the number of calculations that are to be performed in a raytracing method may be reduced significantly with the use of bounding volumes and BVHs; this is because the number of intersections that are to be evaluated may be reduced significantly.

From the above, it is clear that a BVH is well-suited to storing information for use with raytracing methods. However, due to differences in how each process stores and uses data it is not efficient to utilise the BVH with vertex shaders that are also being used during the rendering process. For instance, BVHs are constructed so as to require that there is spatial coherency of the triangles used in the BVH, and triangles may be duplicated between nodes in some cases. Index buffers do not have the same requirement, and as such the encoded information may be different even when representing the same data due to redundancies and the like.

Further to the above considerations it is generally considered impractical to modify a vertex shader itself to instead make use of a BVH structure. One reason for this is simply the range of vertex shaders that exist; modifying each one of these to make use of BVH structures instead of traditional methods would represent a significant overhead. In addition to this, the inputs/outputs of those shaders are generally used in a standardised manner (such as receiving inputs from other processes) and therefore it would be necessary to redesign much or even the entirety of the graphics pipeline to accommodate such a modification.

Figure 5:
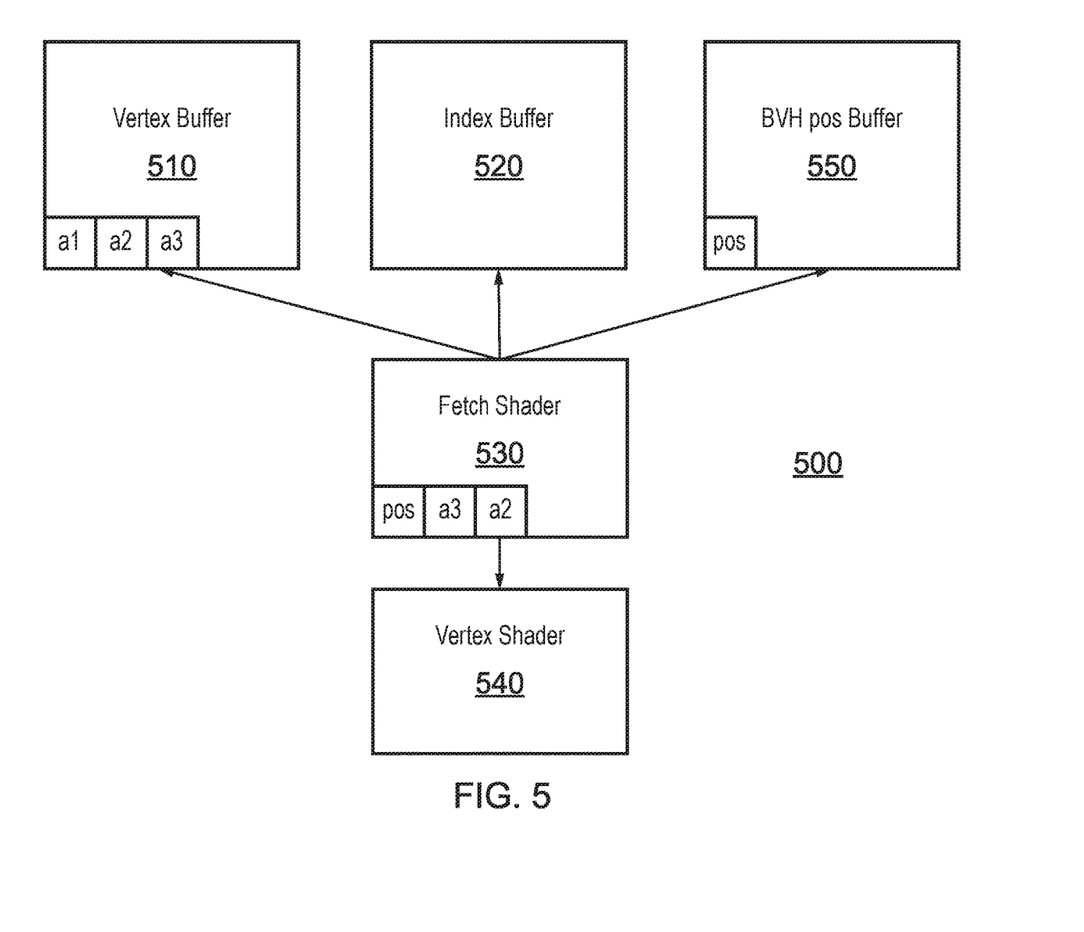
FIG. 5 schematically illustrates a vertex shading system utilising BVH data.

FIG. 5 schematically illustrates an example of an arrangement that is configured to perform a vertex shading process using a BVH structure; this represents a modification to the arrangement of FIG. 1, for example. The BVH may be stored in any suitable location or using any suitable storage medium; this is not shown in this Figure. For example, the BVH may be stored locally on a disk or a hard drive, or may be accessed remotely via a local network connection or the internet.

The arrangement 500 comprises a vertex buffer 510, an index buffer 520, a fetch shader 530, a vertex shader 540, and a BVH pos buffer 550. These may have similar functions to the corresponding units in FIG. 1, as is described below.

The index buffer 520 is configured to perform the same function as in the arrangement of FIG. 1; that is, the index buffer 520 stores information identifying one or more triangles by their respective vertex indices. This may be useful for obtaining information from the vertex buffer 540, for example.

The BVH pos buffer 550 is configured to store information about the position of triangles within the BVH structure, for example by identifying a particular node and position, which enables the triangle data stored in the BVH to be accessed. While this data is analogous to that of the pos data stored by the vertex buffer in FIG. 1 as described above, this will necessarily have a different format. This is because the BVH is stored in a tree format, and as such the use of a linear storage method may be inappropriate.

It is considered that the BVH pos buffer 550 has a smaller size than a traditional vertex buffer for processing the same information, and as such this arrangement may be considered advantageous in that the amount of data required to be stored may be reduced significantly. For example, in some embodiments the BVH pos buffer 550 may be one third of the size of a corresponding vertex buffer (such as the vertex buffer 10 of FIG. 1).

The fetch shader 530 is configured to obtain data from the index buffer 520 relating to the indices of triangles that are to be used by the vertex shader 540, and data from the BVH pos buffer 550 which enables triangle information to be obtained from the BVH structure. This data is then provided to the vertex shader 540 as required.

In some embodiments, the fetch shader 530 is configured to perform a transformation operation so as to transform the BVH position information into object space. As noted above, this is the form in which vertex position data is generally stored in the vertex buffer of FIG. 1.

The vertex shader 540 is operable to perform a vertex shading process using the data output by the fetch shader, as in a conventional vertex shading process. That is to say that the vertex shader need not be modified in view of the modification to use BVH data, such that the same vertex shader as that discussed in the context of FIG. 1 may be used.

The vertex buffer 510 may still be of use in such an arrangement, despite position information being obtained from the BVH instead, as other processing may obtain data from this buffer. For example, the vertex buffer may still be used to store attributes relating to UV mapping of textures (relating to the process of projecting a two-dimensional texture onto a three-dimensional surface), and/or surface normals and tangents. Such data may be obtained by the fetch shader 530, in some embodiments, for use as a part of the vertex shading process performed by the vertex shader 540.

Figure 6:
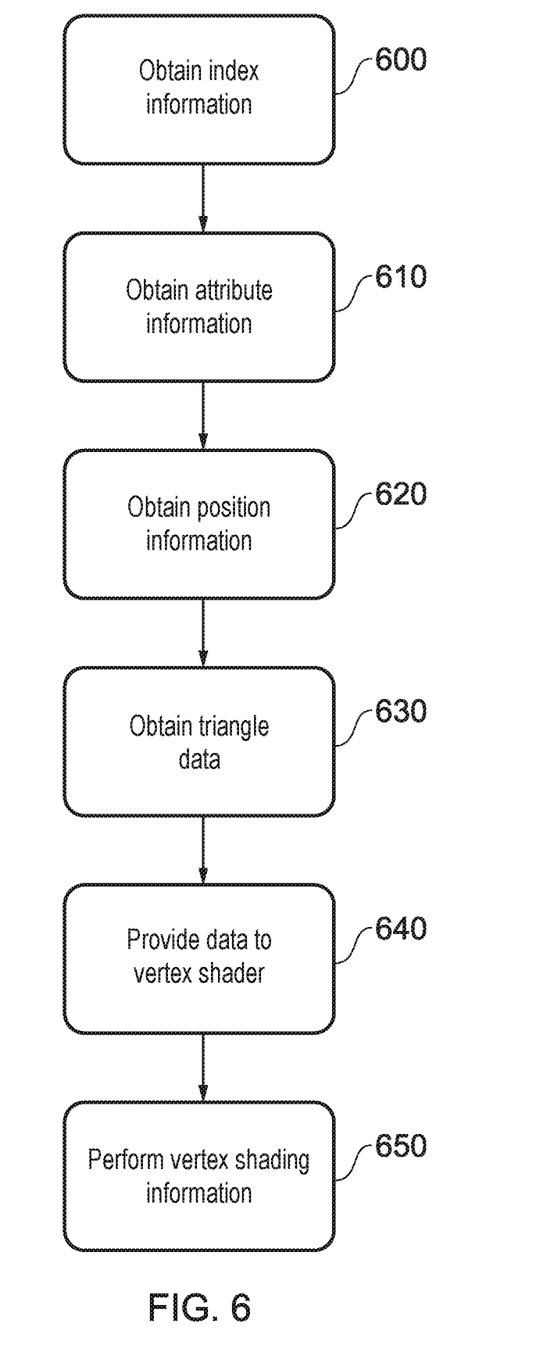
FIG. 6 schematically illustrates a vertex shading method utilising BVH data.

FIG. 6 schematically illustrates an example of a vertex shading method performed in accordance with the arrangement of FIG. 5. The ordering of the steps may be modified as appropriate, rather than being necessarily performed in the order discussed, and one or more steps may be added or omitted in dependence upon the specific process that is being performed.

At a step 600, the fetch shader 530 obtains index information from the index buffer 520. In particular, this comprises one or more indices that correspond to vertices that are to be operated upon by the vertex shader 540.

At a step 610 the fetch shader 530 optionally obtains attribute information from the vertex buffer 510, the attribute information corresponding to the vertices described by the index information obtained in step 600.

At a step 620, the fetch shader 530 obtains position (pos) information from the BVH pos buffer 550 corresponding to those indices identified in the information obtained in the step 600.

At a step 630, the fetch shader 530 obtains triangle data from the BVH using the position information obtained in step 620. In some embodiments, this data is transformed into object space data although this is not considered to be essential.

At a step 640, the fetch shader 530 provides the data obtained in step 630 to the vertex shader 540.

At a step 650 the vertex shader 540 performs a vertex shading operation, such as colour and/or position manipulating of one or more vertices. The results of the vertex shading step 650 may be output for use in a later rasterization process, for example.

In using the above method and arrangement, it is considered that a vertex shading process may be performed using information obtained at least substantially from a BVH. This is advantageous in that the data obtained from the BVH need not be stored in a separate data structure held in the vertex buffer, and as a result the total amount of data used to represent the geometry of a virtual scene is reduced.

Figure 7:
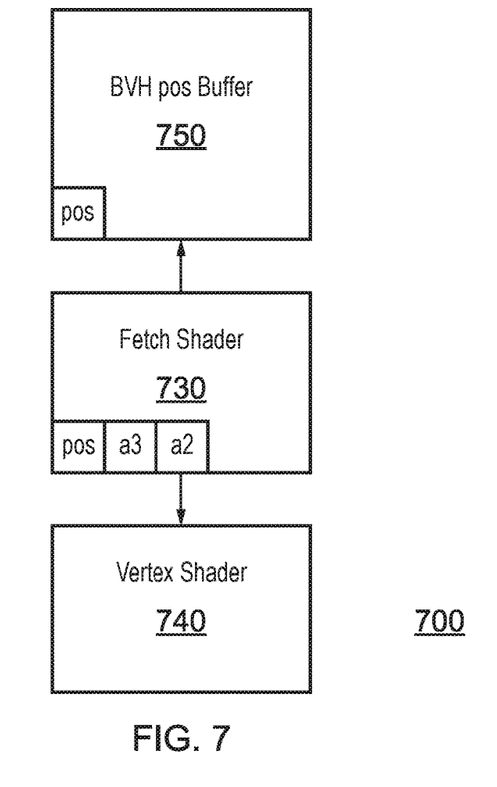
FIG. 7 schematically illustrates a vertex shading system utilising modified BVH data.

FIG. 7 schematically illustrates an example of an arrangement that is configured to perform a vertex shading process using a modified BVH structure. Such an arrangement may be considered to be advantageous in that the index buffer (such as the index buffer 520 of FIG. 5) may be omitted, in addition to optionally omitting the vertex buffer 510.

In this example, the BVH structure is modified so as to store attributes. As noted above, these are traditionally stored in the vertex buffer. By instead storing attribute information in the BVH, there is no need to store index data in the index buffer—this is because the index data is required only to access information from the vertex shader.

In the arrangement 700, the fetch shader 730 is operable to obtain the desired data solely from the BVH pos buffer 750. Using the pos information, all data relating to the triangles encoded in the BVH (including attribute information) may be obtained from the BVH without the use of the index buffer or vertex buffer as described in earlier embodiments. The fetch shader 730 is then operable to provide the obtained data (with or without a transformation as appropriate) to the vertex shader 740.

Such an arrangement, and an associated processing method, may therefore provide additional benefits relating to the reduction of the number of data storage structures that are required to perform an image rendering process.

In some embodiments, further advantages may be obtained in view of the use of the BVH data. For example, the pos data may be compressed by exploiting the fact that the BVH structure utilises triangles. This means that a single index may be stored, with the other vertices of the triangle able to be identified in dependence upon this index. For instance, the other two vertices may each be identified by a respective offset value indicating a location relative to the index.

Alternatively, in some cases a single index and a single bit value may be used to indicate the vertices of the triangle. This is possible because BVH nodes are generally aligned such that it is possible to infer the location of a second vertex based upon knowledge of this alignment, and the location of the final vertex of the triangle can only be in one of two positions (either side of the line defined by the first two vertex positions).

Figure 8:
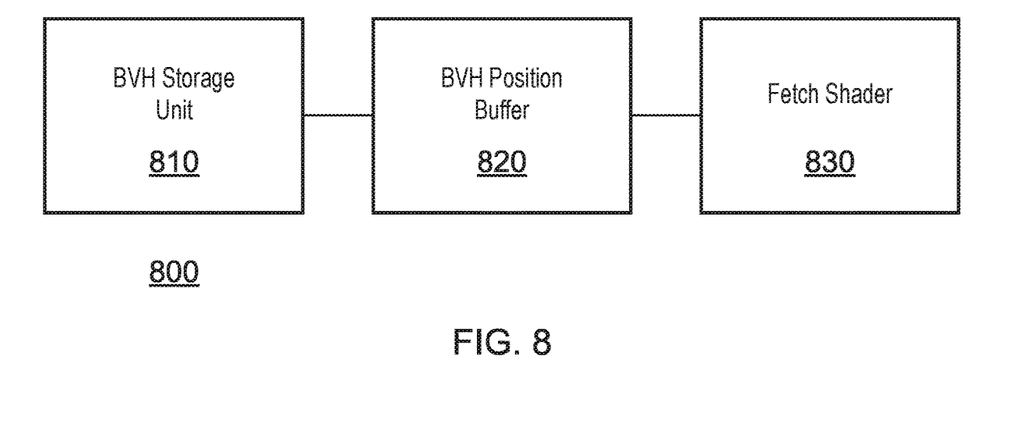
FIG. 8 schematically illustrates an image generation system.

FIG. 8 schematically illustrates a system that is operable to perform a process for obtaining data from a BVH structure and providing corresponding data to a vertex shader with the obtained data. The system 800 comprises a BVH storage unit 810, a BVH position buffer 820, and a fetch shader 830; these units are each used to perform a part of an image generation process, and may be combined with any number of additional elements (such as a vertex shader and a rasterizer) to generate a final image for display.

The BVH storage unit 810 operable to store a BVH comprising a hierarchical structure of a plurality of triangles describing a virtual scene.

The BVH position buffer 820 operable to store data for identifying the location of one or more triangles within the BVH. This data may have any suitable format; in some embodiments the locations of triangles within the BVH are indicated by an index identifying a first vertex of a triangle and a respective offset for each other vertex in the triangle. Alternatively, the locations of triangles within the BVH are indicated by an index identifying a first vertex in a triangle and a bit value.

The fetch shader 830 operable to identify vertex indices for use in rendering images, to obtain one or more triangles within the BVH corresponding to those vertex indices, and to provide vertex data corresponding to those triangles to a vertex shader operable to perform a vertex shading process. The vertex shading process may comprise one or more of the following: modifying a position of a vertex, modifying a colour of a vertex, modifying an orientation of a vertex, and converting a three-dimensional vertex location into a two-dimensional screen position.

In some cases, the fetch shader 830 is operable to perform a transform on the obtained location information for the one or more triangles. For example, this may comprise converting information about one or more triangles to vertex data in a format as would normally be used in the vertex buffer in traditional arrangements. In particular, this may comprise converting the obtained location information into coordinates in object space. Of course, in some embodiments the BVH itself may be adapted so as to comprise this information such that it can be obtained by the fetch shader 830 in a suitable format such that no transformation is required for the data to be compatible with the vertex shader.

The fetch shader 830 may further be operable to obtain attribute data, with the obtained attribute data being used to perform the vertex shading process. This attribute data may comprise any suitable geometry data, for example.

In some embodiments, the system 800 may also comprise a vertex shader operable to perform the vertex shading process using data obtained from the fetch shader. The vertex shading process may comprise any of the processes described above, or indeed any other suitable vertex shading process. The output of the vertex shader may be provided to a rasterizer, or any other suitable image processing unit, for use in generating an image for display.

In some embodiments, the system 800 comprises an index buffer operable to store data identifying vertex indices for use in rendering images. This data may be used to identify locations within the BVH by using a suitable form of address conversion—for example, converting coordinates of vertex indices into the location of a particular triangle within the BVH structure, such as identifying a particular bounding volume and location within the bounding volume.

In some embodiments, the system 800 comprises a vertex buffer operable to store attribute data for one or more vertices. This may be an alternative, or an additional, source of attribute data; in some embodiments the BVH stored by the BVH storage unit comprises attribute data for the triangles.

The arrangement of FIG. 8 is an example of a processor (for example, a GPU and/or CPU located in a games console or any other computing device) that is operable to perform an image generation process (or a part of such a process), and in particular is operable to:

store a bounding volume hierarchy, BVH, comprising a hierarchical structure of a plurality of triangles describing a virtual scene;

store data for identifying the location of one or more triangles within the BVH;

identify vertex indices for use in rendering images;

obtain one or more triangles within the BVH corresponding to those vertex indices; and provide vertex data corresponding to those triangles to a vertex shader operable to perform a vertex shading process.

Figure 9:
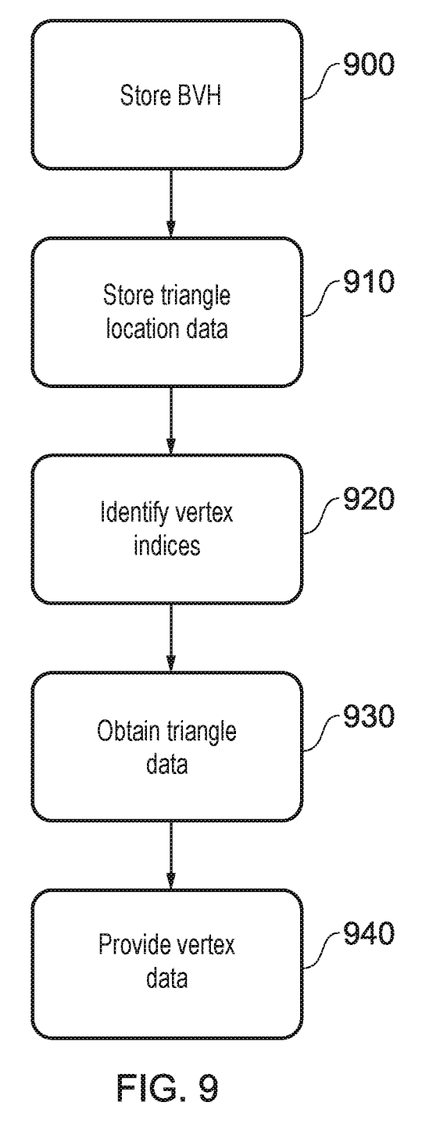
FIG. 9 schematically illustrates an image generation method.

FIG. 9 schematically illustrates a method in which the steps shown form a part of an image generation method. For instance, the method of FIG. 9 may be combined with the operation of one or more processing elements, such as a vertex shader and a rasterizer, to generate an image for display.

A step 900 comprises storing a bounding volume hierarchy, BVH, comprising a hierarchical structure of a plurality of triangles describing a virtual scene.

A step 910 comprises storing data for identifying the location of one or more triangles within the BVH.

A step 920 comprises identifying vertex indices for use in rendering images.

A step 930 comprises obtaining one or more triangles within the BVH corresponding to those vertex indices.

A step 940 comprises providing vertex data corresponding to those triangles to a vertex shader operable to perform a vertex shading process.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented according to one or more of the following numbered clauses:

1. An image generation system comprising:
   a bounding volume hierarchy, BVH, storage unit operable to store a BVH comprising a hierarchical structure of a plurality of triangles describing a virtual scene;
   a BVH position buffer operable to store data for identifying the location of one or more triangles within the BVH; and
   a fetch shader operable to identify vertex indices for use in rendering images, to obtain one or more triangles within the BVH corresponding to those vertex indices, and to provide vertex data corresponding to those triangles to a vertex shader operable to perform a vertex shading process.

2. An image generation system according to clause 1, wherein the locations of triangles within the BVH are indicated by an index identifying a first vertex of a triangle and a respective offset for each other vertex in the triangle.

3. An image generation system according to clause 1, wherein the locations of triangles within the BVH are indicated by an index, identifying a first vertex in a triangle, and a bit value.

4. An image generation system according to any preceding clause, comprising a vertex shader operable to perform the vertex shading process using data obtained from the fetch shader.

5. An image generation system according to any preceding clause, wherein the vertex shading process comprises one or more of the following:
   modifying a position of a vertex;
   modifying a colour of a vertex;
   modifying an orientation of a vertex; and
   converting a three-dimensional vertex location into a two-dimensional screen position.

6. An image generation system according to any preceding clause, wherein the fetch shader is operable to perform a transform on the obtained location information for the one or more triangles.

7. An image generation system according to clause 6, wherein the fetch shader is operable to perform a transform to convert the obtained location information into coordinates in object space.

8. An image generation system according to any preceding clause, comprising an index buffer operable to store data identifying vertex indices for use in rendering images.

9. An image generation system according to clause 8, comprising a vertex buffer operable to store attribute data for one or more vertices.

10. An image generation system according to any of clause 1-7, wherein the BVH comprises attribute data for the triangles.

11. An image generation system according to any preceding clause, wherein the fetch shader is operable to obtain attribute data, and
   wherein the obtained attribute data is used to perform the vertex shading process.

12. An image generation method comprising:
   storing a bounding volume hierarchy, BVH, comprising a hierarchical structure of a plurality of triangles describing a virtual scene;
   storing data for identifying the location of one or more triangles within the BVH;
   identifying vertex indices for use in rendering images;
   obtaining one or more triangles within the BVH corresponding to those vertex indices; and providing vertex data corresponding to those triangles to a vertex shader operable to perform a vertex shading process.

13. Computer software which, when executed by a computer, causes the computer to carry out the method of clause 12.

14. A non-transitory machine-readable storage medium which stores computer software according to clause 13.

The invention claimed is:

1. An image generation system comprising:
a bounding volume hierarchy, BVH, storage unit operable to store a BVH comprising a hierarchical structure of a plurality of triangles describing a virtual scene;
a BVH position buffer operable to store data for identifying the location of one or more triangles within the BVH; and
a fetch shader operable to identify vertex indices for use in rendering images, to obtain one or more triangles within the BVH corresponding to those vertex indices, and to provide vertex data corresponding to those triangles to a vertex shader operable to perform a vertex shading process,
wherein the respective locations of at least some of the plurality of triangles within the BVH are each indicated by a respective index and respective single bit value, which together identify all vertices of a respective one of the at least some of the plurality of triangles.

2. The image generation system of claim 1, wherein the respective locations of at least some others of the plurality of triangles within the BVH are each indicated by a respective index that identifies at least a first vertex, and a respective offset for each other vertex, in a respective one of the at least some others of the plurality of triangles.

3. The image generation system of claim 1, comprising a vertex shader operable to perform the vertex shading process using data obtained from the fetch shader.

4. The image generation system of claim 1, wherein the vertex shading process comprises one or more of the following:
modifying a position of a vertex;
modifying a colour of a vertex;
modifying an orientation of a vertex; and
converting a three-dimensional vertex location into a two-dimensional screen position.

5. The image generation system of claim 1, wherein the fetch shader is operable to perform a transform on the obtained location information for the one or more triangles.

6. The image generation system of claim 5, wherein the fetch shader is operable to perform a transform to convert the obtained location information into coordinates in object space.

7. The image generation system of claim 1, comprising an index buffer operable to store data identifying vertex indices for use in rendering images.

8. The image generation system of claim 7, comprising a vertex buffer operable to store attribute data for one or more vertices.

9. The image generation system of claim 1, wherein the BVH comprises attribute data for the triangles.

10. The image generation system of claim 1, wherein the fetch shader is operable to obtain attribute data, and wherein the obtained attribute data is used to perform the vertex shading process.

11. An image generation method comprising:
storing a bounding volume hierarchy, BVH, comprising a hierarchical structure of a plurality of triangles describing a virtual scene;
storing data for identifying the location of one or more triangles within the BVH;
identifying vertex indices for use in rendering images;
obtaining one or more triangles within the BVH corresponding to those vertex indices; and
providing vertex data corresponding to those triangles to a vertex shader operable to perform a vertex shading process,
wherein the respective locations of at least some of the plurality of triangles within the BVH are each indicated by a respective index and respective single bit value, which together identify all vertices of a respective one of the at least some of the plurality of triangles.

12. A non-transitory machine-readable storage medium which stores computer software which, when executed by a computer, causes the computer to perform a method comprising the steps of:
storing a bounding volume hierarchy, BVH, comprising a hierarchical structure of a plurality of triangles describing a virtual scene;
storing data for identifying the location of one or more triangles within the BVH;
identifying vertex indices for use in rendering images;
obtaining one or more triangles within the BVH corresponding to those vertex indices; and
providing vertex data corresponding to those triangles to a vertex shader operable to perform a vertex shading process,
wherein the respective locations of at least some of the plurality of triangles within the BVH are each indicated by a respective index and respective single bit value, which together identify all vertices of a respective one of the at least some of the plurality of triangles.

* * * * *